Patented June 24, 1930

1,766,946

UNITED STATES PATENT OFFICE

KENNETH HERBERT SAUNDERS, OF MANCHESTER, ENGLAND, ASSIGNOR TO BRITISH DYESTUFFS CORPORATION LIMITED, OF MANCHESTER, ENGLAND

AZO DYES DERIVED FROM AMINOSULPHONES

No Drawing. Application filed August 29, 1925, Serial No. 53,404, and in Great Britain October 21, 1924.

In British Letters Patent No. 18,430 of 1913, is described the production of sulphonchlorides of phenol-o-carboxylic acids by treating phenolcarboxylic acids, or nuclear substitution derivatives of these acids, with chlorsulphonic acid at temperatures below 100° C.

Such sulphonchlorides are the starting material for the present invention; being utilized in the production of a new series of azo and poly-azo dyestuffs and in certain new processes of making the same. In the steps in this manufacture I have invented certain new intermediate compounds and devised certain processes of preparing such intermediate compounds.

I have found that upon reduction the sulphonchlorides of aromatic o-hydroxy-carboxylic acids are converted into sulfinic acids which apparently with one exception, have not hitherto been described, and that these sulfinic acids upon reacting with an aromatic nitro compound having a labile halogen atom, yield new nitrosulphones. I find that the best results are obtained when at least one nitro group in the halogenated nitro body is in the ortho position to the chlorine atom. By reacting upon the sulfinic acids derived from each of the sulphonchlorides mentioned in the said Letters Patent No. 18,430 of 1913 with all the commercially obtainable chloronitro compounds of the benzene and naphthalene series, the number of new nitrosulphones which can be produced is large. The structure of some typical nitro sulphones may be represented as follows:

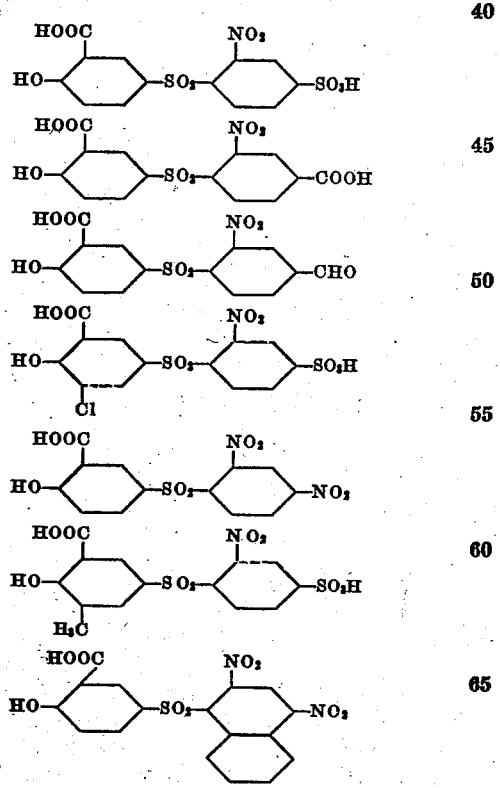

When the nitro group, or groups, in these sulphones are reduced there are obtained aromatic amino sulphones which are useful in the manufacture of azo dyestuffs capable of being used in mordant dyeing without great change in shade. In these dyestuffs a chelate group is carried on one portion of the compound molecule while another portion carries the color-giving or chromophoric groups. By "chelate group" I mean an ortho-hydroxy-carboxylic group which is characterized by being able to react with a chrome or other mordant. The chromophore groups are separated from the chromophoric portion of the molecule by a sulphone bridge; this bridge acting so to speak as a screen. Fixation of the dyestuff by mordant takes place without great change in shade. In other words, these aromatic amino sulphones are mixed sulphones carrying two aryl groups of different character, one of the aryl groups carrying a chelate grouping and the other aryl group having the amino group or groups attached thereto. Such mixed sulphones may be represented by the general formula

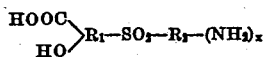

wherein $R_1$ represents a benzene residue, $R_2$ represents a benzene or naphthalene residue. The said residues represented by $R_1$ and $R_2$ may or may not be further substituted and $x$ is 1 or 2 and in which the OH and COOH groups attached to the $R_1$ are ortho to each other. By the term aryl residue, I mean benzene or naphthalene residues which may or may not be further substituted. Mixed aromatic amino sulphones of this type are set forth and claimed in my copending applications Ser. Nos. 303,371 and 398,805 which are divisions of the present application.

In preparing azo dyestuffs from such mixed sulphones, any hydroxy-, amino- or aminohydroxy compound capable of coupling may be used as the second component, the choice being determined by the shade or properties (e. g. solubility, fastness to chlorine, etc.) of the required dyestuff. Dis- or polyazo-dyestuffs may be built up if desired. Many different specific dyestuffs may be produced in accordance with the present invention. All of these new dyestuffs may be represented by the following generic formula

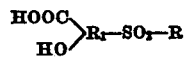

wherein $R_1$ represents a benzene residue and R represents a benzene or naphthalene residue having an azo group attached thereto, the grouping represented by R possessing chromophoric properties and in which the OH and COOH groups attached to the $R_1$ are ortho to each other. These new dyes are likewise mixed sulphones carrying two aryl groups (benzene) of different character, one of the aryl groups (benzene) being chromophoric and the other (benzene or naphthalene) being of non-chromophoric character but capable of uniting with mordants. Such azo dyestuffs possess the characteristic property of being capable of application in mordant dyeing without substantial change in shade. They are characterized by having the chelate group separated from and connected to the chromophoric portion of the dyestuff by a sulphone bridge; the sulphone bridge acting as a chromophoric screen. Hence when these new dyestuffs are fixed on animal or vegetable fibers by metallic mordants little or no change in shade occurs.

The present invention is more particularly directed to those azo dyestuffs which may be represented by the general formula

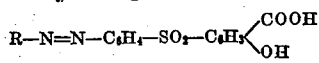

wherein R represents a coupling component and in which the hydroxyl and carboxyl groups are ortho to each other.

The following examples will serve to illustrate the invention further but the invention is not confined to the examples:—

*Example I*

10 parts of salicylic sulphonchloride (prepared, for instance, according to the method of British Letters Patent 18430 of 1913), are dissolved in 20 parts of alcohol and the solution rapidly agitated with external cooling. Slightly more than one atomic proportion of zinc dust (about 2.8 to 3 parts) is then added in small portions so that the temperature does not rise unduly. Soon after the addition of zinc the separation of crystals begins and continues rapidly until finally the content of the vessel becomes a semi-solid magma. The solvent is filtered off, the residue is dried and dissolved in caustic soda, preferably as a strong solution. This solution is then filtered, chilled and slowly made acid to Congo paper during gentle agitation. Upon standing the salts formed throw out the sulfonic acid as small, shining crystals which can be filtered off and dried. When working under the conditions above described, the product obtained appears to consist of an equimolecular compound of the free sulfionic acid with its acid sodium salt and is sufficiently pure for use in most processes without further purification. It decomposes slowly on standing, and can be readily distinguished from the 5-sulphonic acid whose crystals melt at 120° since on heating it does not decompose until about 200° C. It is insoluble in ether and most organic solvents, but soluble in alcohol. With ferric chloride it gives a bluish-red color in dilute aqueous solution.

The method described above may be widely varied, for instance, the reaction may with advantage be carried out in the presence of an acid-binding agent, such as calcium carbonate. The crude zinc sulfinate may be decomposed with sodium carbonate solution either hot or cold, and the sulfinic acid liberated from the solution after removal of zinc carbonate.

By similar treatment, o-cresotinic sulphonchloride and the sulphonchloride of 3-chloro salicylic acid yield the corresponding sulfinic acids which form colorless crystals. The crude products as usually obtained melt at 150–160° C. with decomposition. They are ether-soluble, have a sulfinic acid content of 85 per cent and upwards, the remainder being apparently anhydride. Both crude products yield a red-violet color with dilute aqueous ferric chloride.

I make no claim for the process of reduction of salicylic sulphonchloride with alkaline sodium sulfite as published by Stewart (Journal of the Chemical Society (London) 1922, 2559). If desired, the ether-soluble acid of melting point 159° C. as there described can be obtained through the decomposition with mineral acid of my zinc salt or the calcium salt.

*Example II*

10 parts of salicylic sulfinic acid, 13 parts of the sodium salt of 4-chloro-3-nitrobenzene sulphonic acid, 5.3 parts of sodium carbonate and 25 parts of water are boiled together for some hours, the solution becoming deep orange color as reaction proceeds. The sulphone which has been produced may be isolated either by acidifying the hot solution or by forming the barium salt and evaporating to crystallization when a pale yellow granular substance, readily soluble in warm water, is obtained. For the present purposes, the nitrosulphone in the solution may be reduced without isolation by any convenient method of reduction e. g., iron filings and acid, zinc dust and acid, stannous chloride, sodium sulphide, etc., while the solution of the amine so obtained may have its content of diazotizable amino compound determined by titration with standard nitrite solution and used directly for dye-making. The solutions of the amine itself are colorless when pure. The amino sulphone in the form of the free acid has the probable formula

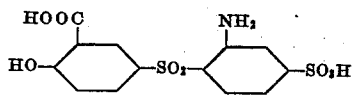

Not only may this nitrosulphone be reduced, but it may be also chlorinated before reduction by the action of alkali metal hypochlorite in the well-known manner. It is supposed that chlorination occurs in the vacant position ortho to the hydroxy group.

By using an equivalent quantity of o-cresotinic sulfinic acid and working in the same manner as above, the corresponding nitro sulphone and amino sulphone may be obtained as compounds closely similar to those described.

*Example III*

10 parts of o-cresotinic sulfinic acid are added to a boiling alcoholic solution of 9.35 parts of 2:4-dinitro-chlorobenze and 4.6 parts of potassium acetate. From the solution, clear at first, a copious white precipitate soon separates and after boiling for some time and cooling, this is filtered off. The nitro sulphone so obtained has in the form of the free acid the probable formula

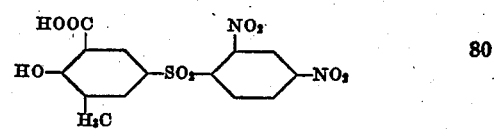

The dinitrosulphone may be purified by dissolving in alkali and reprecipitating with acid. It may be reduced in a variety of ways, but a convenient agent is stannous chloride which smoothly reduces either one or both of the nitro groups. In the first instance, a diazotizable amine is produced and in the second a diamine which gives a deep brown dyestuff by the action of nitrous acid. This diamine yields mono-acidyl-derivatives which are useful azo dyestuff components.

In a similar manner, 1-chloro-2:4-dinitro naphthalene condenses with sulfinic acids while 2:6-dinitro-chloro-benzene-4-sulphonic acid condenses either in aqueous or alcoholic solution.

*Example IV*

An acid solution containing 10 parts of the amino sulphone prepared according to Example II is cooled and diazotized with a solution of 2.32 parts of sodium nitrite. Part of the diazo compound separates as a pale yellow solid. When the reaction is complete, the diazo solution is allowed to flow into an alkaline solution of 7.73 parts of beta-hydroxynaphthoic anilide. When coupling is complete, the dyestuff is salted from the hot alkaline solution, filtered and dried, forming a bright scarlet powder. Printed on cotton cloth with a chrome mordant, the dyestuff yields salmon pink shades fast to hot soap and chlorine.

Instead of beta-hydroxynaphthoic anilide, beta-naphthol (orange), beta-naphthylamine (scarlet), ethyl-beta-naphthylamine (bluish-red), phenyl methyl pyrazolone (pure yellow), ethyl benzylaniline (orange) etc. may be used. In addition to being useful printing colors, all the above may be dyed on wool as acid chrome colors yielding shades which resist milling and potting.

If the amino sulphone derived from o-cresotinic sulfinic acid and 4-chloro-3-nitrobenzene sulphonic acid be used, dyestuffs closely resembling those mentioned above are obtained. The probable formulæ of some of the materials prepared according to this example may be indicated as follows, the formula given in each case being that of the dye in the form of its free acid. Dye from the anilide of beta-hydroxynaphthoic acid

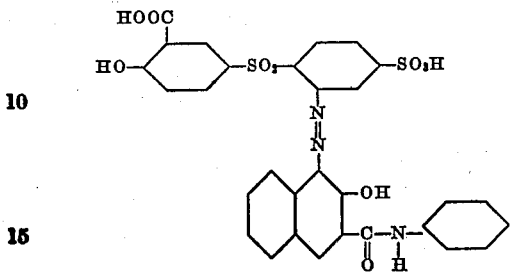

Dye from pyrazolone

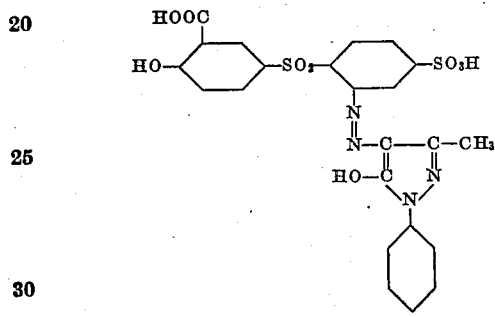

Dye from ethylbenzylaniline

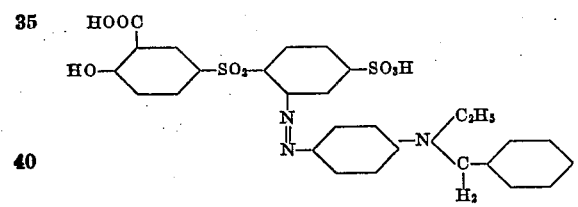

*Example V*

10 parts of the disodium salt of the amino sulphone obtained by reducing the nitrosulphone produced from 5-sulfino salicylic acid and 4-chloro-3-nitrobenzoic acid that is to say, 2-amino-4′-hydroxy-4:3′-dicarboxydiphenyl sulphone are dissolved in water containing 1.82 parts of sodium nitrite. This solution is allowed to run with rapid stirring and cooling into dilute acid whereby the diazo derivative is formed. This latter is yellow in color and sparingly soluble in water. The diazo compound is then allowed to run in a thin stream into an acid solution of 3.78 parts of beta-naphthylamine. The solution is slowly made alkaline, warmed, filtered and the dyestuff salted out from solution and dried. Printed on cotton cloth with a chrome mordant, the dyestuff yields bright scarlet shades fast to hot soap.

Instead of beta-naphthylamine, beta-naphthol (orange), ethyl-beta-naphthylamine (bluish-red), 1-naphthol-4-sulphonic acid (scarlet) 1:8-dihydroxynaphthalene-3:6-disulphonic acid (helio) etc., may be used.

Like the dyestuffs of the preceding example, these dyes may be used either as chrome printing colors for cotton or as acid chrome colors for wool. The free dye prepared from beta-naphthylamine has the following probable formula

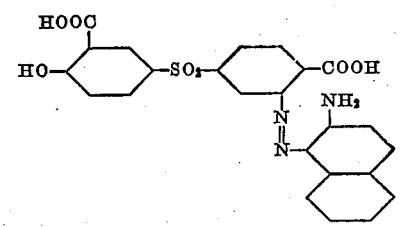

When 1:4-naphtholsulphonic acid is employed the free acid of the dye has the following probable formula

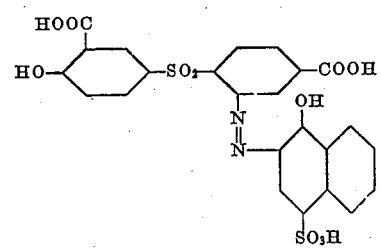

The following formula represents the compound which may be obtained when using 1:8-dihydroxynaphthalene-3:6-disulphonic acid

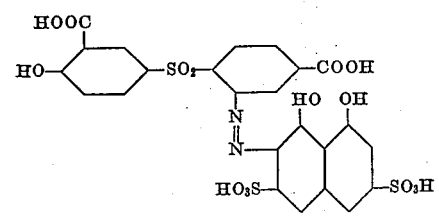

*Example VI*

To the acid suspension of the diazo compound described in Example IV, there is added a solution of 4.62 parts of paraxylidine hydrochloride. When the coupling has been completed by removal of mineral acidity by acetate, the solution is reacidified and a solution of 2.02 parts of sodium nitrite added. When this has been absorbed, the new diazo compound is coupled with 8.16 parts of acetyl-J-acid, the dyestuff is salted out from solution, filtered off and dried. When printed on cotton it yields a heliotrope fast to warm soap. The structural formula may be represented as follows:

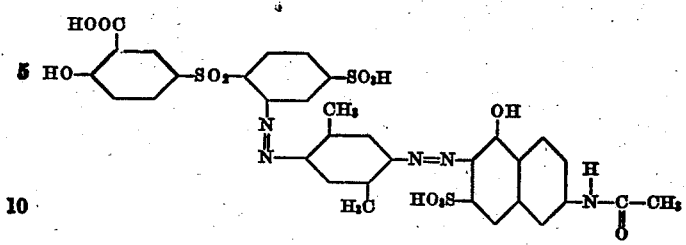

*Example VII*

10 parts of the monamine which has the probable formula

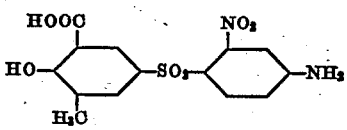

and which is obtained by reducing with stannous chloride the dinitrosulphone of Example III are dissolved in sodium carbonate, 1.96 parts of sodium nitrite added, and the chilled solution slowly acidified. The diazo compound separates in yellow flakes and the suspension is run into an alkaline solution of 7.4 parts of the sodium salt of beta-naphthylamine-methyl-omega-sulphonate. Coupling takes place at once. The finished dyestuff is salted out from solution, filtered off and dried at a low temperature. When printed on cotton with a chrome mordant, the dyestuff yields red shades fast to hot soap. This dyestuff has the probable formula

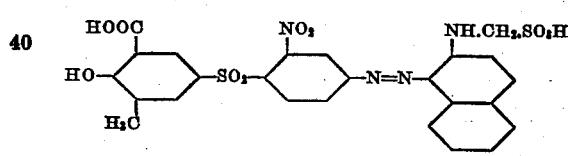

*Example VIII*

The diamine obtained by the reduction of the condensation product of 5-sulfino-salicylic acid with 2:4-dinitrochloro-benzene is boiled with excess oxalic acid until nitrous acid no longer gives a brown dyestuff but a pale yellow diazo compound.

10 parts of the oxaminic acid so obtained are dissolved in water containing 2.74 parts of soda ash and 1.82 parts of sodium nitrite. This solution is run into chilled mineral acid when diazotization takes place. The diazo solution is then run with stirring into a solution containing soda ash and 3.69 parts of beta-naphthol dissolved in caustic soda. An orange-red dyestuff is formed at once. This is salted out from the warm solution, filtered off and dried. When printed on cotton with a chrome mordant it yields orange shades fast to chlorine and warm soap. The structural formula of the dye derived from beta-naphthol may be indicated as follows:

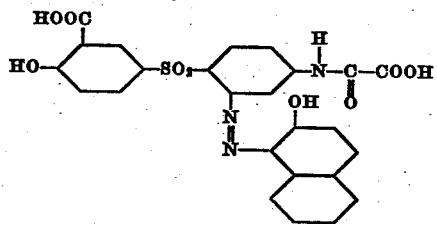

The 5-sulphino-salicylic acid, its salts, homologues and analogues, such as can be obtained according to my invention, possess the following reactions:—They give an intensely blue colored solution when mixed with phenetol and strong sulphuric acid, and a deep red to purple solution with ferric chloride. Two molecules of one of the sulfinic acids will go into reaction with 1 molecule of nitrous acid, yielding a sulphydroxamic acid.

My new mono- and dinitrosulphones possess the following properties:—They are white or pale yellow colored substances easily obtained in the crystalline state from aqueous or alcoholic solution. They dissolve in caustic alkalies to give yellow to orange colored solutions and give a red coloration in dilute aqueous solution with ferric chloride. If the ortho position to the hydroxyl group is not occupied they chlorinate smoothly with aqueous alkali hypochlorite. They are quantitatively reduced by titanous chloride.

The mono-amino sulphones of this invention occur as well defined colorless crystalline substances when obtained by crystallizing the alkali metal salts from water. They give a red coloration with dilute aqueous ferric chloride solution and their diazo compounds are usually of a pale yellow color sparingly soluble in water.

The diamino sulphones give a red coloration with dilute aqueous ferric chloride solution and exhibit all the general properties of diamines of the benzene series.

All my new dyestuffs not containing an oxidizable second component (e. g. 1:8-dihydroxynaphthalene-3:6-disulphonic acid) are characterized by the property that practically no change in shade occurs on chroming the dyeings on wool, but that after chroming the shades become fast to milling and potting. Similarly when printed on cotton with a chrome mordant the shade of the original dye solution is preserved but the print is fast to warm soap.

What I claim is:

1. In the manufacture of azo dyes, the process which comprises reacting upon a 5-sulphino salicylic acid with an aromatic nitro compound having a labile chlorine atom, reducing the nitro sulphone to an amino sulphone, diazotizing said amino sulphone and then coupling the diazotized sulphone with the usual azo dye coupling components.

2. In processes of producing azo dyestuffs the steps comprising diazotizing an aminodiphenylsulfone compound containing a hydroxyl and a carboxyl group in ortho position to each other in the nucleus containing no amino group, in which both nuclei can be further substituted and which can be represented by the general formula $$H_2N-C_6H_4-SO_2-C_6H_3(OH)(COOH)$$

coupling the diazo compound obtained with an aromatic coupling component and isolating the azo dyestuff formed.

3. In processes of producing azo dyestuffs the steps comprising diazotizing an aminodiphenylsulfone sulfonic acid compound containing a hydroxyl and carboxyl group in ortho position to each other in the nucleus containing no amino group, in which both nuclei can be further substituted and which can be represented by the general formula $$(H_2N)(SO_3H)C_6H_3-SO_2-C_6H_3(OH)(COOH)$$

coupling the diazo compound obtained with a coupling component of the naphthalene series and isolating the azo dyestuff formed.

4. The process of manufacturing azo dyes which comprises diazotizing an amino sulphone having the probable structural formula

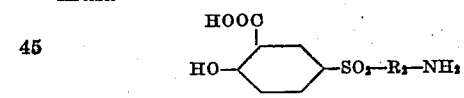

wherein $R_2$ represents an aromatic nucleus which may be further substituted, and coupling said diazotized amino sulphone with the usual coupling components.

5. The process of manufacturing azo dyes which comprises diazotizing an amino sulphone having the structural formula

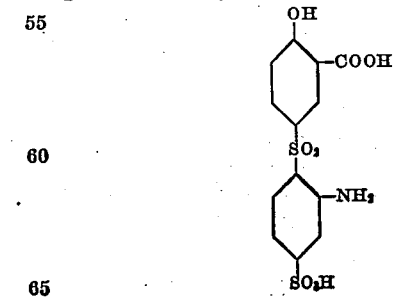

and coupling said diazotized amino suphone with the usual coupling components.

6. The process of manufacturing azo dyes which comprises diazotizing an amino sulphone having the structural formula

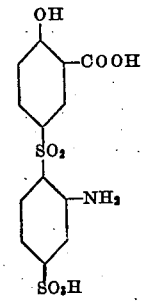

and coupling said diazotized amino sulphones with beta-naphthol.

7. Azo dyes carrying a chelate group and adapted for mordant dyeing with the chelate group separated from the chromophore group by a sulphone bridge, said azo dyes being mixed sulphones with the probable formula

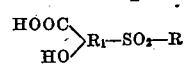

wherein $R_1$ represents a benzene residue and R represents a benzene or naphthalene residue having an azo group attached thereto, the grouping represented by R possessing chromophoric properties, and in which the said residues R and $R_1$ may or may not be further substituted and the COOH and the OH groups are ortho to each other, the said dyestuffs producing shades which are substantially unchanged when chromed.

8. Azo dyes carrying a chelate group and adapted for mordant dyeing, with the chelate group separated from the chromophore group by a sulphone bridge, said azo dyes being mixed sulphones with the probable formula

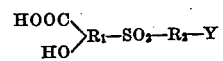

wherein $R_1$ represents a benzene residue and $R_2$ represents a benzene or naphthalene residue and in which the said residue $R_1$ and $R_2$ may or may not be further substituted and Y represents the substituent group $-N=N-R_8$ or $-N=N-R_8-N=N-R_9$ wherein $R_8$ and $R_9$ are residues of azo dye components and in which the COOH and OH groups are ortho to each other, the said dyestuffs producing shades which are substantially unchanged when chromed.

9. Azo dyestuffs carrying a chellate group and adapted for mordant dyeing with the chelate group separated from the chromophore group by a sulphone bridge, the said azo dyes being mixed sulphones having the probable formula

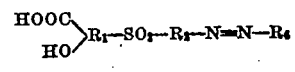

wherein $R_1$ represents a benzene residue and $R_2$ represents a benzene or naphthalene residue and in which the said residues $R_1$ and $R_2$ may or may not be further substituted, and $R_6$ represents a coupled azo dye component and in which the COOH and OH groups are ortho to each other, the said dyestuffs producing shades which are substantially unchanged when chromed.

10. Azo dyestuffs carrying a chelate group and adapted for mordant dyeing with the chelate group separated from the chromophore group by a sulphone bridge, the said azo dyes being mixed sulphones having the probable formula

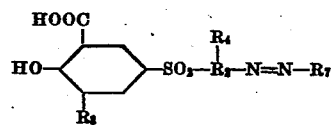

wherein $R_2$ represents a benzene or naphthalene residue, $R_4$ represents hydrogen, a sulphonic group, nitro group or oxalylated amino group, $R_3$ represents H, $CH_3$ or Cl and $R_7$ represents a coupled residue from an azo dye coupling component.

11. As new products, the azo dyes prepared by diazotizing and coupling an amino sulphone having the structural formula

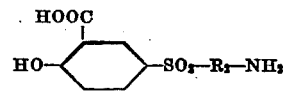

wherein $R_2$ represents an aromatic nucleus which may or may not be further substituted, with the usual azo dye coupling component.

12. As new products mordant azo dyestuffs of the general formula $R_7-N=$
$N-C_6H_4-SO_2-C_6H_3(OH)(COOH)$ in which the coupling component $R_7$ is a naphthalene derivative and the hydroxyl and carboxyl groups are in ortho position to each other and in which the benzene nuclei of the diphenylsulfone can be further substituted, said dyestuffs in the form of their alkali metal salts being easily soluble in water and concentrated sulfuric acid and said dyestuffs dyeing textile fibres, particularly on chrome mordants, in exceedingly fast shades.

13. As new products mordant azo dyestuffs of the general formula

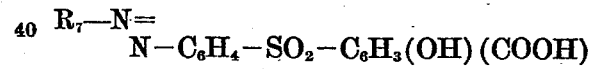

in which $R_7$ is a coupling component, said dyestuffs in the form of their alkali metal salts being easily soluble in water and concentrated sulfuric acid and said dyestuffs dyeing animal fibres, particularly on chrome mordants, in exceedingly fast shades.

14. As a new product, the azo dye having in the form of the free acid the structural formula

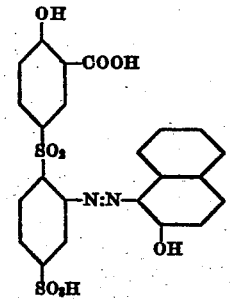

In testimony whereof I have hereunto affixed my signature.
KENNETH HERBERT SAUNDERS.

Certificate of Correction

Patent No. 1,766,946.                                  Granted June 24, 1930, to

KENNETH HERBERT SAUNDERS

It is hereby certified that error appears in the printed specification of the above numbered patent requiring correction as follows: Page 2, line 115, for the misspelled word "sulfionic" read *sulfinic;* page 4, lines 75 to 85, strike out the formula and insert instead

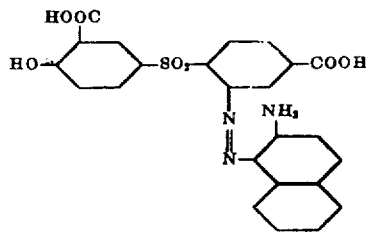

and that the said Letters Patent should be read with these corrections therein that the same may conform to the record of the case in the Patent Office.

Signed and sealed this 2d day of September, A. D. 1930.

[SEAL.]

M. J. MOORE,
*Acting Commissioner of Patents.*